United States Patent Office 2,840,562

Patented June 24, 1958

2,840,562

SALTS OF POLYBASIC ACIDS, ATROPINE, AND ADRENERGIC AMINES

Ely Fein, Bayside, N. Y., assignor, by mesne assignments, to The Chemac Company, Yonkers, N. Y., a co-partnership No Drawing. Application December 29, 1953
Serial No. 401,073

5 Claims. (Cl. 260—292)

The present invention relates to a new and improved chemical composition and it relates more particularly to an improved chemical composition possessing superior spasmolytic properties.

It is a principal object of the present invention to provide an improved chemical composition having superior pharmacological properties.

Another object of the present invention is to provide a novel and improved chemical composition capable of producing prolonged and pronounced spasmolytic action.

The present invention is based on the broad discovery that the composition effected by a solution of a polybasic acid, a tropine alkaloid and an adrenergic amine possesses the highly desirable pharmacological property of producing prolonged and pronounced spasmolytic action. The improved composition may be separated from the solvent by evaporation of the latter or by other conventional processes. The resulting product is believed to be a true compound or salt.

The tropine alkaloids which may be employed are generally those which are capable of forming salts with acids and include atropine D,L or DL, homatropine, tropine, hyoscine and scopolamine. A pharmacological effect of these alkaloids are that they are capable of blocking parasympathetic action preventing the nerve impulse from reaching the effector organ innervated by parasympathetic nerve fibers.

Included in the adrenergic amines is a class consisting of phenyl ethyl amines in which the nitrogen can be unsubstituted or contain a methyl group with the phenyl group being unsubstituted or containing amino or dihydroxy substituent. These amines are capable of forming salts with acids. Examples of the adrenergic amines are D,L or DL epinephrine $C_9H_{13}NO_3$, D,L or DL ephedrine $C_{10}H_{15}NO$, mephentermine $C_{11}H_{17}N$, D,L or DL arterenol $C_8H_{11}NO_3$, D,L or DL N-isopropyl arterenol $C_{11}H_{17}NO_3$, D,L or DL amphetamine $C_9H_{13}N$, D,L or DL napthazoline $C_{14}H_{14}N_2$ and D,L or DL phenylephrine $C_9H_{13}NO_2$.

Examples of the polybasic acids which may be employed are succinic, oxalic, malonic, malic, maleic, fumaric, D,L or DL tartaric, meso-tartaric, glutaric, pimelic, citric, iso-citric, itaconic, tricarballylic, phthalic, benzene dicarboxylic and mucic.

The following examples, which are intended to be illustrative and in no way limitative, indicate improved compositions in accordance with the present invention, some of their properties and characteristics, and methods of producing them:

*Example 1*

0.192 grams of citric acid, was dissolved in 4 to 8 mls. of a solvent such as water, alcohol, or a mixture of both, heat being applied when necessary to accelerate solution. 0.1832 gram of the less soluble base of epinephrine was added to the acid solution and dissolved with vigorous stirring. When the solution was complete 0.2894 gram of atropine alkaloid was added and stirred until it too went into solution.

If the solvent was water, or a mixture of water and alcohol, the salt was recovered by evaporation in vacuo. If the solvent was alcohol the salt was precipitated by the addition of 5 to 10 volumes of absolute ether. The resulting crystals were highly hygroscopic.

The structural formula of the above compound is believed to be:

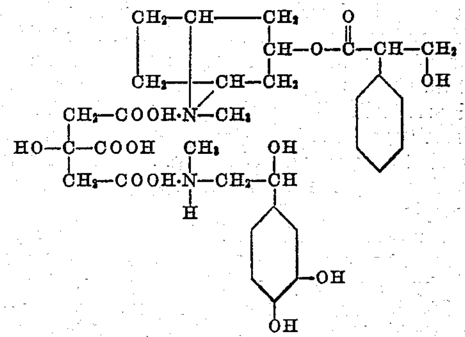

The above compound caused broncho dilatation and spasmolysis in the intestine of an anaesthetized dog. The action was so complete that for at least 2 hours a spasmogen of the neostigmine type was unable to evoke a constriction of bronchi or intestinal muscles. The effect on blood pressure was negligible.

*Example 2*

3.26 grams of mephentermine base and 5.76 grams of atropine alkaloid were dissolved in 10 mls. of ethanol at room temperature. To the above was added 3 grams of tartaric acid which was dissolved in 10 mls. of water at room temperature. The solution became warm and was evaporated to dryness in vacuo. A white hygroscopic powder was obtained which weighed 10.5 grams. This powder was dissolved in boiling isopropanol and on cooling, white crystals (rosettes) were deposited. These crystals melted at 115–145° C. and were slightly hygroscopic. The ultra violet absorption spectrum of the above crystalline material was maximum at $\lambda=2515$ to 2520 A. with E 1 cm. 1% of 5.8 and another maximum at $\lambda=2575$ A. with an E 1 cm. 1% of 6.7 in water solution. Atropine sulfate under the same conditions gave maxima at $\lambda=2515$ to 2520 A. with E 1 cm. 1% of 4.4 and $\lambda=2575$ A. with E 1 cm. 1% of 5.6. The corresponding E*m* values were as follows:

| | | |
|---|---|---|
| λ | 2515–2520 | 2575 |
| atropine sulfate | 352 | 408 |
| atropine mephentermine tartrate | 348 | 402 |

The above indicates that the atropine mephentermine tartrate combination was in stoichiometric proportions and indicated that a true salt was formed.

The structure formula of the composition produced in accordance with Example 2 is believed to be:

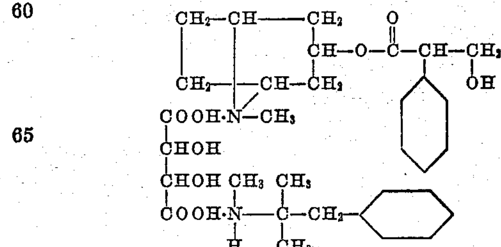

The above compound was found to have prolonged spasmolytic activity, particularly of the bronchial muscles and the intestine with no effect on blood pressure when administered by mucous membrane absorption and very negligible effect when administered intravenously to dogs. Once the compound was administered it protected the animal against challenging doses of neostigmine of bronchoconstriction. The compound was found to have an $LD_{50}$ of Ca 75 mg./kg. in mice when administered intravenously. Also this compound protected guinea pigs against lethal aerosolization of acetyl choline chloride.

*Example 3*

This example describes the preparation of the salt of atropine and isopropyl arterenol with tartaric acid. The method of preparation was the same as for Example 2 except that the mephentermine was substituted with isopropyl arterenol. The weights used in the preparation of this salt were 2.2 grams of isopropyl arterenol, 5.76 grams of atropine base, and 3.0 grams of tartaric acid.

The above crystals of the resulting product were very hygroscopic.

Upon intravenous administration into an anaesthetized dog, this salt relieved the spasm of bronchi and intestine induced by a spasmodic dose of neogtigmine. There was a considerable drop in blood pressure when 1 mg./kg. of the salt in Example 3 was administered intravenously to an anaesthetized dog. The protective action of this last salt against bronchoconstriction was of short duration 3–4 minutes, as compared to the salt in Example 2.

The structure formula of the salt in accordance with Example 3 is believed to be:

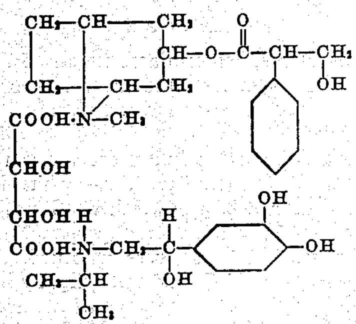

*Example 4*

The salt in this example consists of atropine base with amphetamine and tartaric acid. The preparation of the salt was similar to that of Example 2.

This salt had spasmolytic properties in doses of 0.1 mg./kg. when administered intravenously to anaesthetized dogs. The effect on blood pressure was negligible. This salt is a white amorphous salt.

The structural formula of this compound is believed to be:

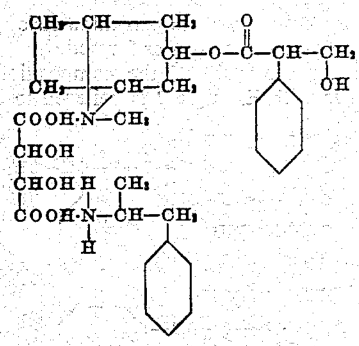

The amounts of material used in the preparation of the compound in Example 4 were 2.7 grams of amphetamine, 5.76 grams atrophine base and 3 grams of tartaric acid.

*Example 5*

The salt prepared in this example was similar to that in Example 2 with the exception that ephedrine was used.

The amounts employed were 3.3 grams of ephedrine base, 5.76 grams of atropine base, and 3 grams of tartaric acid.

This salt consisted of white crystals and physiologically showed spasmolytic activities in 0.1 mg./kg. The blood pressure was not affected by the intravenous administration to anaesthetized dogs.

The structure formula for the salt in Example 5 is believed to be:

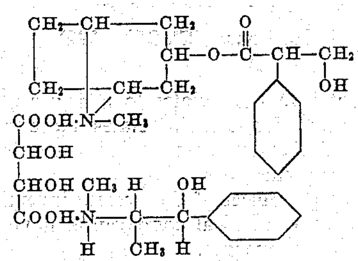

While there has been described preferred embodiments of the present invention it is apparent that numerous alterations and omissions may be made without departing from the spirit thereof.

What is claimed is:

1. A novel chemical compound represented by the formula

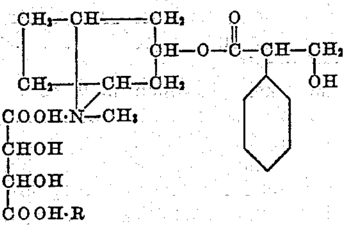

wherein R is a member of the class consisting of mephentermine, isopropylarterenol, amphetamine and ephedrine.

2. A novel chemical compound represented by the formula:

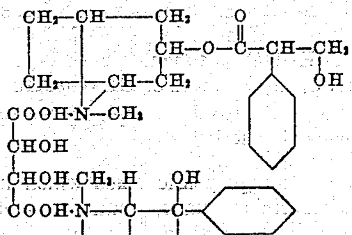

3. A novel compound in accordance with claim 1 wherein R is mephentermine.

4. A novel compound in accordance with claim 1 wherein R is isopropylarterenol.

5. A novel compound in accordance with claim 1 wherein R is amphetamine.

References Cited in the file of this patent

UNITED STATES PATENTS

| | | |
|---|---|---|
| 1,717,585 | Schoeller | June 18, 1929 |
| 2,628,185 | Lewenstein | Feb. 10, 1953 |

FOREIGN PATENTS

| | | |
|---|---|---|
| 140,989 | Australia | Apr. 30, 1951 |